US008731728B2

(12) United States Patent
Milosevic et al.

(10) Patent No.: US 8,731,728 B2
(45) Date of Patent: May 20, 2014

(54) POWER DISTRIBUTION SYSTEM

(75) Inventors: Borka Milosevic, Smyrna, GA (US);
Kamal Mannar, Singapore (SG);
Aleksandar Vukojevic, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 471 days.

(21) Appl. No.: 13/189,929

(22) Filed: Jul. 25, 2011

(65) Prior Publication Data
US 2013/0030584 A1 Jan. 31, 2013

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)

(52) U.S. Cl.
USPC ........... 700/291; 700/286; 700/292; 700/295; 700/297

(58) Field of Classification Search
USPC ................. 700/22, 286, 291–293, 295–298
See application file for complete search history.

(56) References Cited

U.S. PATENT DOCUMENTS

| 4,857,821 | A | * | 8/1989 | Takeda | 323/210 |
|---|---|---|---|---|---|
| 4,999,565 | A | * | 3/1991 | Nilsson | 323/210 |
| 5,099,190 | A | * | 3/1992 | Sato | 323/210 |
| 5,422,561 | A | | 6/1995 | Williams et al. | |
| 5,555,548 | A | * | 9/1996 | Iwai et al. | 709/208 |
| 6,925,362 | B2 | * | 8/2005 | Machitani et al. | 700/286 |
| 7,069,117 | B2 | * | 6/2006 | Wilson et al. | 700/295 |
| 7,940,029 | B2 | * | 5/2011 | Johnson | 323/207 |
| 8,072,093 | B2 | * | 12/2011 | Jacobson et al. | 307/19 |
| 8,271,148 | B2 | * | 9/2012 | Lee et al. | 700/298 |
| 8,301,314 | B2 | * | 10/2012 | Deaver et al. | 700/298 |
| 8,588,993 | B2 | * | 11/2013 | Feng et al. | 700/298 |
| 2007/0043549 | A1 | * | 2/2007 | Evans et al. | 703/18 |

* cited by examiner

*Primary Examiner* — Ramesh Patel
(74) *Attorney, Agent, or Firm* — Cantor Colburn LLP

(57) ABSTRACT

A power distribution system is provided, including at least one capacitor bank with a capacitor bank controller, a transformer, at least one voltage regulating device with a voltage regulating device controller, and a controller. The capacitor bank is selectively connected to the feeder and a capacitor bank controller. The capacitor bank controller controls a switch for selectively connecting the capacitor bank to the feeder. The transformer delivers power to the power distribution system through the feeder. The transformer converts a transmission or a sub-transmission voltage into a distribution voltage. The controller is in communication with the capacitor bank controller, the voltage regulating device, and the transformer. The controller selectively switches the at least one capacitor bank to adjust voltage in the feeder. The controller selectively sends commands to the voltage regulating device to change a source voltage.

20 Claims, 6 Drawing Sheets

FIG. 2
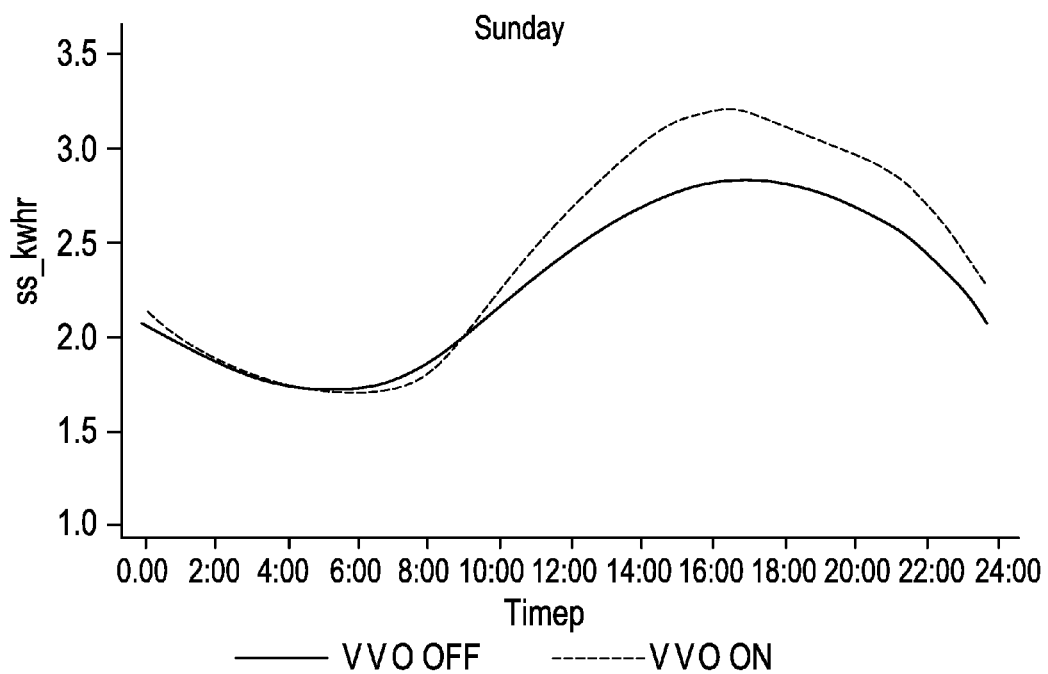
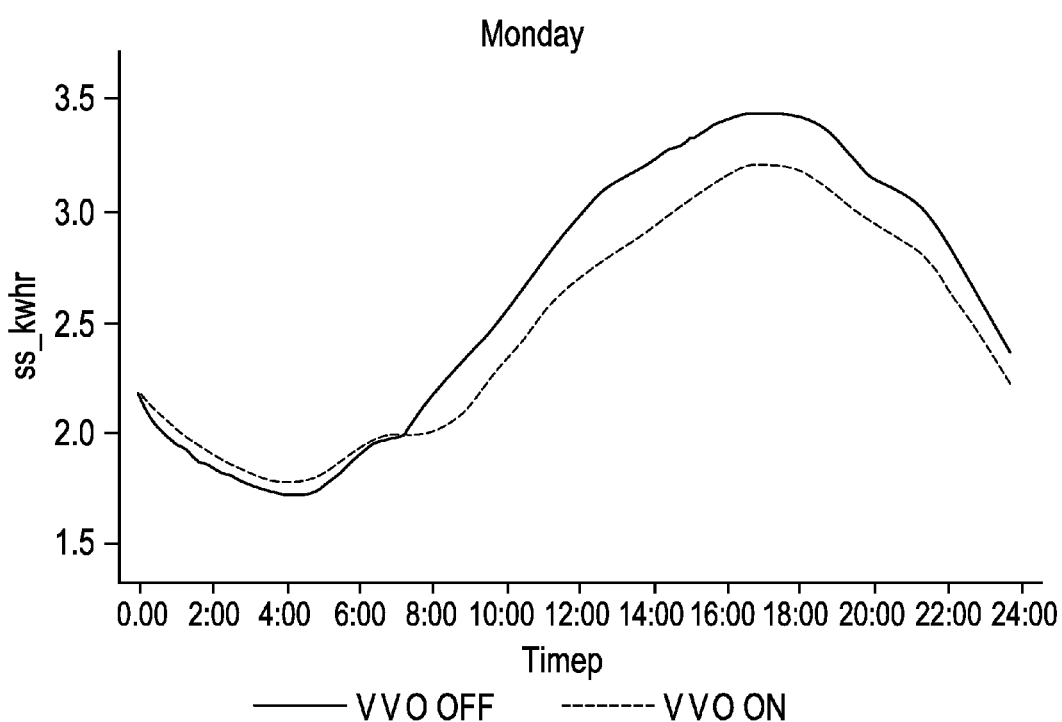

POWER DISTRIBUTION SYSTEM

BACKGROUND OF THE INVENTION

The subject matter disclosed herein relates to a power distribution system, and more specifically to a power distribution system having at least one capacitor bank and at least one voltage regulating device.

Power generation systems produce two power components. The first component is real power that is measured in watts, and the second component is reactive power that is measured in volt-ampere reactive (VAR). Both of these power components need to be generated by the system and transmitted to a service customer. This is because real power is used to drive loads such as incandescent lighting, while reactive power is used in the operation of magnetizing currents in devices such as motors or transformers.

In the US, the required voltage delivered to the service customer by the power distribution system typically ranges between about 114 and about 126 volts. Sometimes a utility provider might want to conserve energy, especially if incentives are provided for energy efficiency. In this example, voltage delivered to the service customer is typically maintained as closely to 114 volts as possible, while also having as little voltage deviation as possible. One approach for maintaining the voltage delivered to the service customer as closely to the required reduced value as possible is by employing a scheme that is commonly referred to in the art as a Voltage and VAR Optimization (VVO) scheme.

A VVO scheme typically employs a load tap changer (LTC) and/or a voltage regulator (VR) installed in the substation and infield voltage regulators and capacitor banks. For example, the amount of active and reactive power needed by the power distribution system can vary depending on the time of day as well as seasonal changes. As a result, sometimes using the VVO scheme may not always results in energy savings.

BRIEF DESCRIPTION OF THE INVENTION

According to one aspect of the invention, a power distribution system is provided and includes at least one capacitor bank with a capacitor bank controller, a transformer, at least one voltage regulating device having a voltage regulating device controller, and a controller. The capacitor bank controller controls a switch for selectively connecting the capacitor bank to the feeder. The transformer delivers power to the power distribution system through the feeder. The transformer converts a transmission or a sub-transmission voltage to a distribution voltage. The controller is in communication with the capacitor bank controller, the voltage regulating device, and the transformer. The controller selectively switches the capacitor banks to adjust the voltage on the feeder, and controls a source voltage through the voltage regulating device. The controller includes control logic for receiving a plurality of variables that determine a non-adjusted energy consumption of the power distribution system at a specified future date. The non-adjusted energy consumption is based on a plurality of variables, and is without the controller selectively switching the at least one capacitor bank, and without adjusting the voltage regulating device. The controller also includes control logic that estimates an adjusted energy consumption of the distribution power distribution system at a specified future date. The estimated energy consumption is based on the plurality of variables, and is with the controller selectively switching the at least one capacitor bank, and adjusting the voltage regulating device.

The controller includes control logic for determining the difference between the energy consumption between the adjusted and the non-adjusted energy consumption. The controller includes control logic for sending signals to the capacitor bank controller and the voltage regulating device controller. The signal is sent at the specified future date.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 is an illustration of several graphs comparing power consumption of the power distribution system in FIG. 1;

The detailed description explains embodiments of the invention, together with advantages and features, by way of example with reference to the drawings.

DETAILED DESCRIPTION OF THE INVENTION

As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
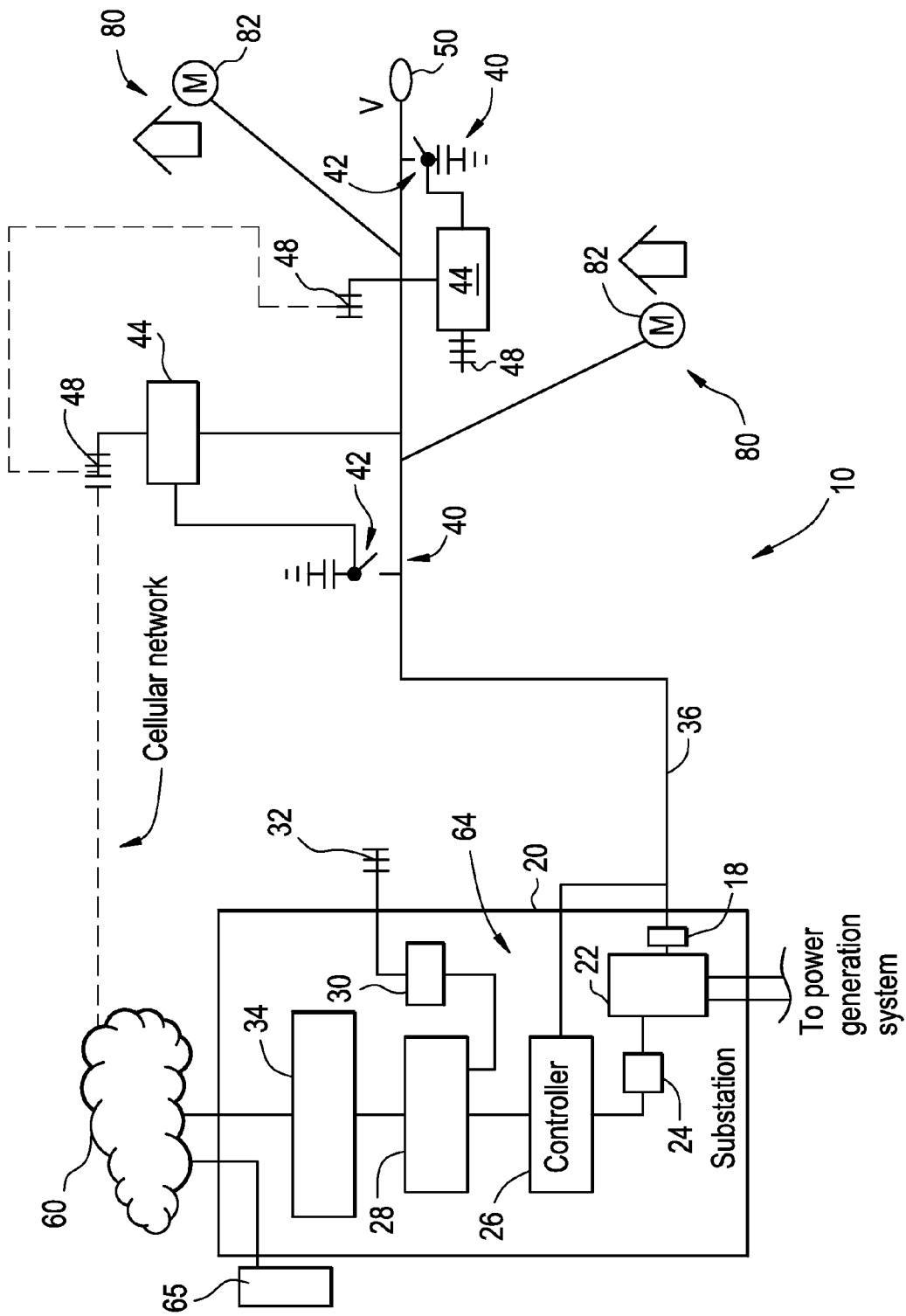
FIG. 1 is a schematic illustration of an exemplary power distribution system having a substation control module.

FIG. 1 is a schematic illustration of an exemplary power distribution system indicated by reference number 10. The power distribution system 10 includes a substation 20 having a voltage regulating device 14, a voltage regulator controller 16, a breaker 18, a transformer 22, a load tap changer (LTC) controller 24, a substation master controller 26, an Ethernet switch 28, a wireless communication device 30, an antenna 32, and a frame relay 34. The transformer 22 is connected to a transmission system (not shown) and delivers power through a feeder 36. The feeder 36 is connected to a plurality of capacitor banks 40. Each capacitor bank 40 is selectively switched "ON" and "OFF" by a corresponding switch element 42. A capacitor bank control module 44 controls the switch elements 42 for selectively switching the capacitor bank 40. Each capacitor bank controller 44 has a corresponding antenna 48 associated therewith. Although FIG. 1 illustrates a plurality of capacitor banks 40, it is to be understood that one capacitor bank 40 may be included as well. The voltage regulating device 14 may be a voltage regulator (VR) on the feeder 36. Alternatively, the voltage regulating device may also be a load tap changer (LTC) located on the transformer 22 as well.

In the embodiment as illustrated, the transformer 22 includes a load tap changer (LTC), which controls the voltage on the feeder 36. Although FIG. 1 illustrates an LTC, it is to be understood that other approaches may be used as well to adjust the distribution voltage by the transformer 22 such as, for example, a voltage regulator. The feeder 36 has a reduced voltage point 50, which represents the reduced allowable voltage that the feeder 36 may have. The reduced allowable voltage at the reduced voltage point 50 is typically 114V. If the voltage along the feeder 36 is above or below the required limits (typically between about 114 V to about 126 V), then the LTC operates to bring the distribution voltage on the feeder 36 within acceptable limits.

The distribution voltage of the transformer 22 is controlled by the LTC control module 24. The transformer control module 24 is in communication with the substation master control module 26. The substation master control module 26 is connected to the Ethernet switch 28. Ethernet switch 28 is connected to the wireless communication device 30 that has the antenna 32 associated therewith. In addition, Ethernet switch is connected to the substation frame relay 34. The substation master control module 26 is in wireless communication with the capacitor bank controllers 44 through the antennas 32 and 48. FIG. 1 illustrates two different approaches that may be used to wirelessly connect the substation master control module 26 with the capacitor bank controllers 44. In the first approach, the wireless communication device 30 includes a radio frequency (RF) transceiver (not shown), and the antenna 32 sends and receives RF signals from the antennas 48. Specifically, the antennas 48 are each in communication with a corresponding capacitor bank controller 44. Each of the capacitor bank controllers 44 also include an RF transceiver (not shown). The substation master control module 26 sends RF signals to the capacitor bank controllers 44 indicating whether the capacitor banks 40 should be switched "ON" or "OFF". It should be noted that at least some utility providers do not have the substation master control module 26 and the capacitor bank controllers 44 in direct RF communication with one another because of security concerns. Instead, the utility provider may provide a gateway where the RF signal is sent from the antenna 48 of the capacitor bank 40 to the gateway, and then to the substation control module 26.

In an alternative approach, the substation control module 26 is in wireless communication with the capacitor bank controllers 44 through a cellular network. In one exemplary embodiment utilizing the cellular network approach, the substation master control module 26 sends and receives packets of data over the cellular network to and from the capacitor bank 40 utilizing the substation frame relay 34, a cellular network 60 and the antenna 48.

Switching any capacitor bank 40 "ON" or "OFF" will change the voltage and the voltage drop along the feeder 36. The substation master control module 26, the LTC control module 24, the capacitor banks 40, the switch elements 42, the capacitor bank controllers 44, and the antennas 48 are part of a Voltage and VAR Optimization (VVO) scheme 64. The VVO scheme 64 is used to selectively switch the capacitor banks 40 "ON" and "OFF" to adjust the voltage on the feeder 36. The master controller 26 also includes control logic for selectively adjusting a source voltage through the voltage regulating device 14. Specifically, the master controller 26 includes control logic for sending signals to either or both the voltage regulator controller 16 and the LTC controller 24. The master controller 26 may also include control logic for sending new settings to the capacitor bank controllers 44, the LTC controller 24, and the voltage regulator controller 16. The master controller 26 may also send LOWER or RAISE commends or new settings to the capacitor bank controllers 44, the LTC controller 24, and the voltage regulator controller 16. In an exemplary embodiment, the VVO scheme 64 may be used to reduce real power losses on the feeder 36. This approach is generally employed in the event that a utility provider wants to increase the power system efficiency, especially if incentives are provided for reduced energy consumption. In yet another embodiment, the VVO scheme may be used to reduce the amount of energy consumed during peak hours, as power generated during peak consumption times tends to be the most costly type of energy produced.

The behavior of the VVO scheme 64 typically depends on a variety of factors. That is, depending on a variety of factors, the VVO scheme 64 may operate to reduce the amount of energy consumed during certain conditions, while increasing the amount of energy consumed during another set of conditions. This is because the load changes based on a plurality of variables such as, but not limited to, the time of day, seasonal changes, the day of the week, meteorological data such as ambient temperature, humidity and solar load, the end-of-line voltage of the feeder 36 at the reduced voltage point 50, energy consumed by the service customers, long-term seasonality, and long-term ambient conditions. These variables are communicated to the substation control module 26 by a remote device, or are calculated by the substation control module 26.

For example, the amount of energy consumed by service customers tends to vary depending on the time of day. Specifically, in one example more energy tends to be consumed by service customers in the mid-afternoon versus early in the morning. Seasonal changes also affect the amount of energy consumed by service customers. This is because service consumers tend to change the energy consumption habits during different ambient conditions, thereby changing the mix of loads required. For example, during the summer, the ambient temperatures are usually elevated. As a result, service customers tend to run air conditioning units. Air conditioning units represent temperature controlled loads which consume less power at lower voltage, but will run longer, thus having the total consumed energy to remain the same. In contrast, constant impendence loads, such as incandescent lighting, consume power proportionally to the voltage squared, and therefore reduce the energy consumed when the voltage is lowered. The day of the week may also affect the load needed by service customers. For example, FIG. 2 is an exemplary illustration of hourly expected energy consumption on a Sunday and a Monday for a particular utility. As shown in FIG. 2, the load profiles between Sunday and Monday illustrate varying energy consumption habits. It should also be noted that in the illustration as shown, employing the VVO scheme 64 on Sunday will tend to result in increased energy consumption, however, on Monday employing the VVO scheme 64 will tend to result in decreased energy consumption.

Meteorological data such as ambient temperature, humidity and solar load also tends to affect the amount of energy consumed by service customers. This is because service consumers tend to change the energy consumption habits during different ambient conditions, thereby changing the mix of loads required. The meteorological data is typically determined by obtaining weather information data at a specified time intervals (i.e., an hour-by-hour weather forecast). Long-term seasonality and long-term ambient conditions also affects the amount of every consumed by service customers. This is because energy consumption depends on prior temperature trends observed in the same day. It should also be noted that the temperature profile observed in the course of one day will also change depending on seasonal changes as well.

Referring back to FIG. 1, the substation master control module 26 includes control logic for receiving data indicating the time of day, the day of the week, and meteorological data such as ambient temperature, humidity and solar load. For example, in one embodiment the antenna 32 receives wireless communication signals from a weather station (not shown) indicating the weather forecast for the next day. For example, the data sent from the weather station could provide an hour-by-hour meteorological report for the next day. The antenna 32 then sends the wireless communication signals to the substation control module 26.

In one approach, the energy consumed by the service customers is communicated to the substation control module 26 through a utility back office 65. Specifically, the utility back office 65 receives data indicating the amount of energy consumed. The data is typically sent to the utility back office 65 once a day, however, other increments of time may be used as well. The utility back office 65 sends the information over the cellular network 60 and to the master controller 26. Alternatively, in the event that the cellular network 60 is unavailable, a metering system 80 may be used having a plurality of meters 82. The meters 82 may be used to collect energy consumption data from a service customer.

In one embodiment, the substation master control module 26 includes control logic for calculating the long-term seasonality and the long-term ambient conditions. For example, in one embodiment a time series model analysis analyzes time series temperature data in order to extract key features of temperature data, and identifies the relationship between the current temperature and the time series temperature data. Specifically, in one example the time series model is an autoregressive integrated moving average (ARIMA) model. The ARIMA model is fit to the temperature series data to predict or forecast future long-term seasonality and long-term ambient conditions. The coefficients of the ARIMA model are then used as inputs to predict future long-term seasonality and long-term ambient conditions.

The substation master control module 26 includes control logic for determining an energy consumption prediction model based on the plurality of variables such as the time of day, seasonal changes, the day of the week, meteorological data such as ambient temperature, humidity and solar load, the end-of-line voltage of the feeder 36 at the reduced voltage point 50, energy consumed by the service customers, long-term seasonality, and long-term ambient conditions. For example, in one embodiment, the energy consumption prediction model is built using the coefficients of the ARIMA model, the measurements of meteorological data, the day of the week as an independent variable, and the energy consumed by the service customers as a dependent variable. In one example, the energy consumption prediction model determines the predicted energy consumption in hourly increments of time, however it is to be understood that the energy prediction model may also predict energy consumption in other increments of time as well. The relationship between many of the variables may be non-linear and may include higher order interactions between one another (e.g., the interaction between the day of the week and the ambient temperature). Because there is a strong correlation between some of the variables such as, for example, between the day of the week and ambient temperature) there may be co-linearity between the variables as well.

Figure 3:
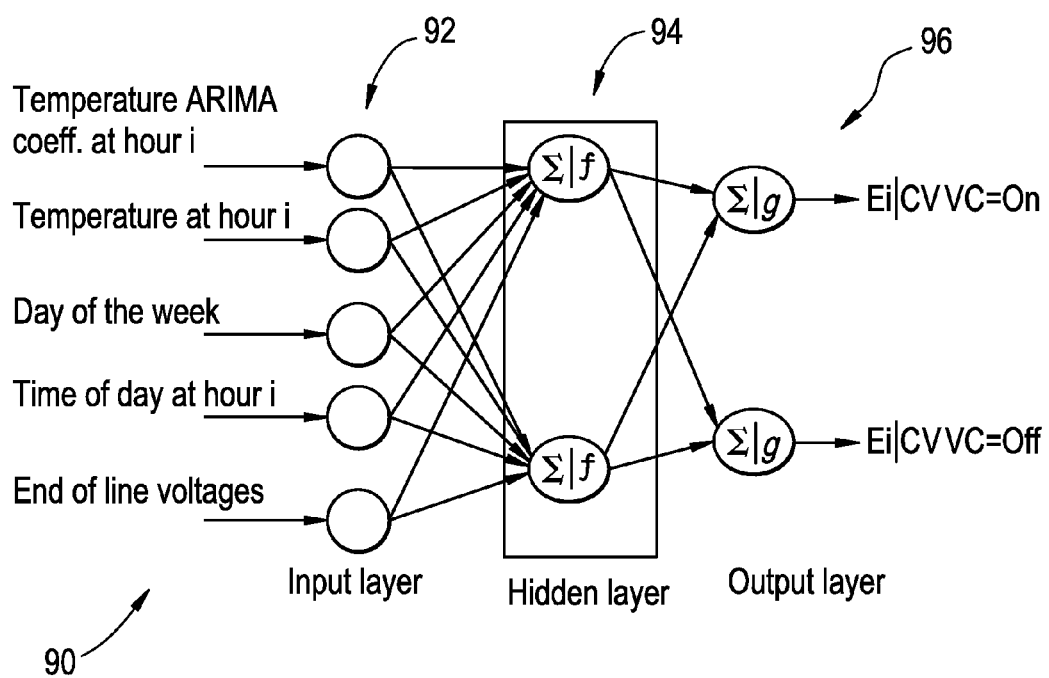
FIG. 3 is an illustration of an exemplary neural network that is employed by the substation control module shown in FIG. 1.

In one approach, a neural network may be used to develop the energy consumption prediction model, however it is to be understood that other approaches may be used as well. For example, in another embodiment, a generalized additive model or a Multivariate Adaptive Spline may be used instead, depending on sample size and required prediction accuracy. Turning now to FIG. 3, an exemplary multilayer neural network topology 90 is shown. In the embodiment as shown, the neural network 90 includes an input layer 92, a hidden layer 94, and an output layer 96. The input layer 92 includes a plurality of inputs such as, for example, the coefficients of the ARIMA model, the ambient temperature at a specified increment of time (i.e. hourly), the day of the week, the time of day at the specified increment of time, and the end of line voltage of the feeder 36 at the reduced point 50.

In one embodiment, each of the inputs of the input layer 92 may be duplicated and sent to all of the nodes in the hidden layer 94. The input values from the input layer 92 entering the nodes of the hidden layer 94 are typically multiplied by weights. The weighted inputs, which are the input values from the input layer 92 multiplied by weights, are then added together to produce a single number, which is shown in FIG. 3 by the symbol Σ. Before leaving each node of the hidden layer 94, the single number is passed through a nonlinear mathematical function called a sigmoid, where the output of the sigmoid is between 0 and 1. The outputs from the hidden layer 94 are then sent to each node of the output layer 96. The nodes of the output layer 96 combine and modify the values receives from the hidden layer 94 to produce the two output values, which are VVO status ON and VVO status OFF. That is, the two output values indicate the energy consumed with the VVO scheme 64 activated (VVO status ON) and deactivated (VVO status OFF). In one embodiment, the substation control module 26 may not activate the VVO scheme 64 unless the energy savings is above a specified threshold. For example, in one embodiment, the substation master control module 26 may include control logic for activating the VVO scheme if the estimated energy savings or is above a specified threshold value.

Figure 4:
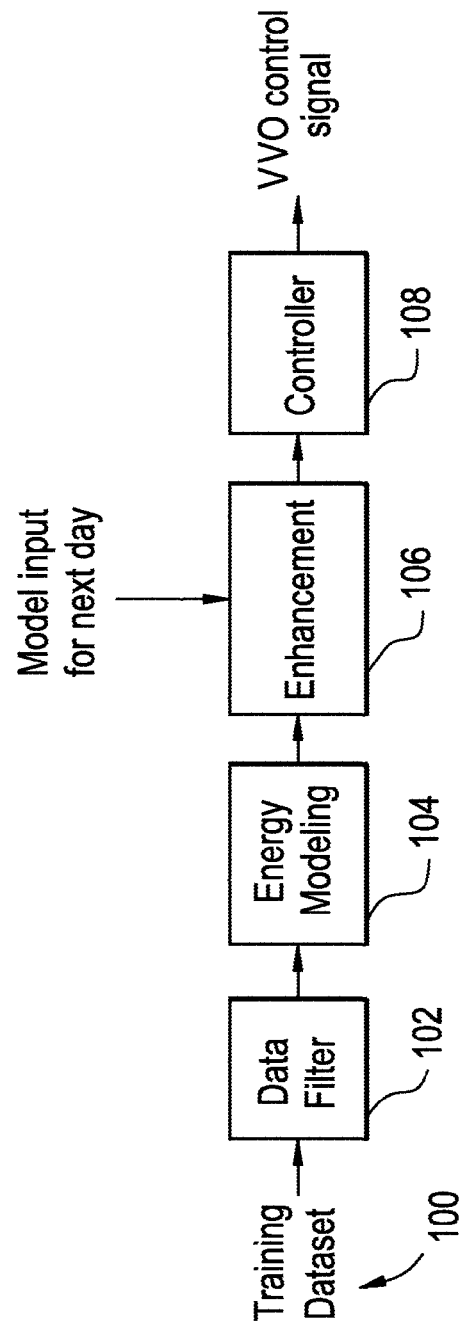
FIG. 4 is a block diagram of the substation control module illustrated in FIG. 1.

The neural network 90 may be trained to predict the energy consumption for the following day. Turning now to FIG. 4, which is a block diagram illustrating the VVO scheme control that is performed by the substation master control module 26. Specifically, a training data set 100 may be provided to the substation master control module 26 containing historical data from the substation 20 or the feeder 36 containing sampling of data with the VVO scheme 64 activated and deactivated. Specifically, the data typically contains the variables such as the time of day, seasonal changes, the day of the week, meteorological data such as ambient temperature, humidity and solar load, the end-of-line voltage of the feeder 36 at the at the reduced voltage point 50, energy consumed by the service customers, long-term seasonality, and long-term ambient conditions.

Figure 5:
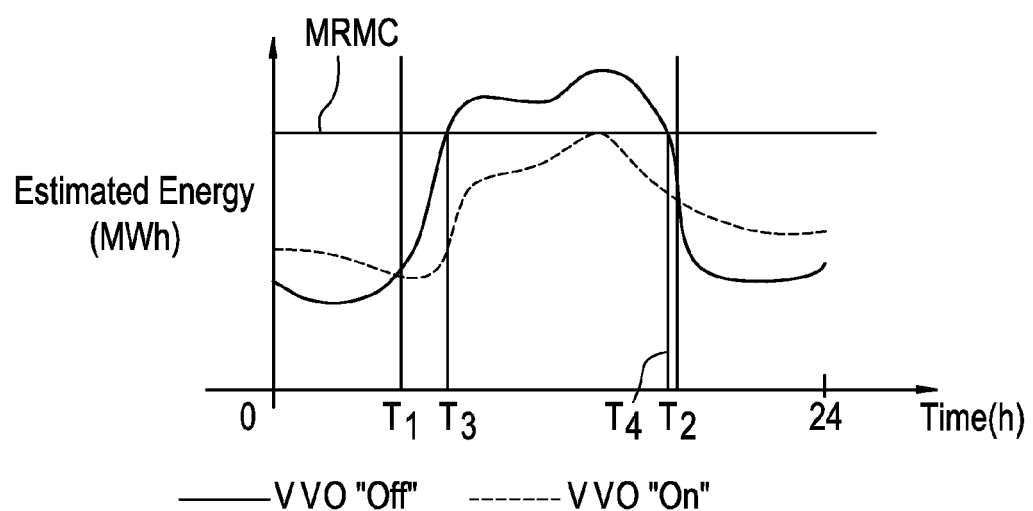
FIG. 5 is an illustration of an example of power consumption of the power distribution system with and without employing the VVO scheme shown in FIG. 1.

The training data 100 is first sent through a data filter 102 in the substation master control module 26. The data filter 102 removes data that cannot typically be used to predict the energy consumption. For example, the data filter 102 filters out data collected during periods with intermittent or no communication between the substation control module 26 and the data collection equipment (i.e., a weather station). Filtered data from the data filter 102 is then sent to an energy consumption prediction module 104 to develop the energy consumption model (i.e., the neural network 90 shown in FIG. 3). The energy model 104 calculates energy consumption with the VVO scheme 64 activated and deactivated. These energy consumption values are then sent to the enhancement block 106. Specifically, in one embodiment the energy consumption with the VVO scheme 64 activated and deactivated is calculated on an hourly basis. The hourly consumption values are sent to the enhancement block 106. The enhancement block 106 then determines the hours of the next day to activate the VVO scheme 64. For example, FIG. 5 is an exemplary illustration of one energy estimate with the VVO scheme 64 activated and deactivated. In the event that a utility provider wants to conserve energy, then the enhancement block 106 would elect to activate the VVO scheme 64 between times T1 and T2.

Turning back to FIG. 4, the enhancement block 106 then sends a control signal to the controller block 108. The controller block 108 sends a signal indicating whether or not the VVO scheme 64 should be activated or not. In one exemplary embodiment, the VVO scheme 64 may be randomly activated and deactivated in an effort to tune the energy consumption model as well. Specifically, the VVO scheme 64 could be randomly activated or deactivated in the event that the error between the predicted energy and the actual energy consumed exceeds a specified limit for a specified amount of time.

Figure 6:
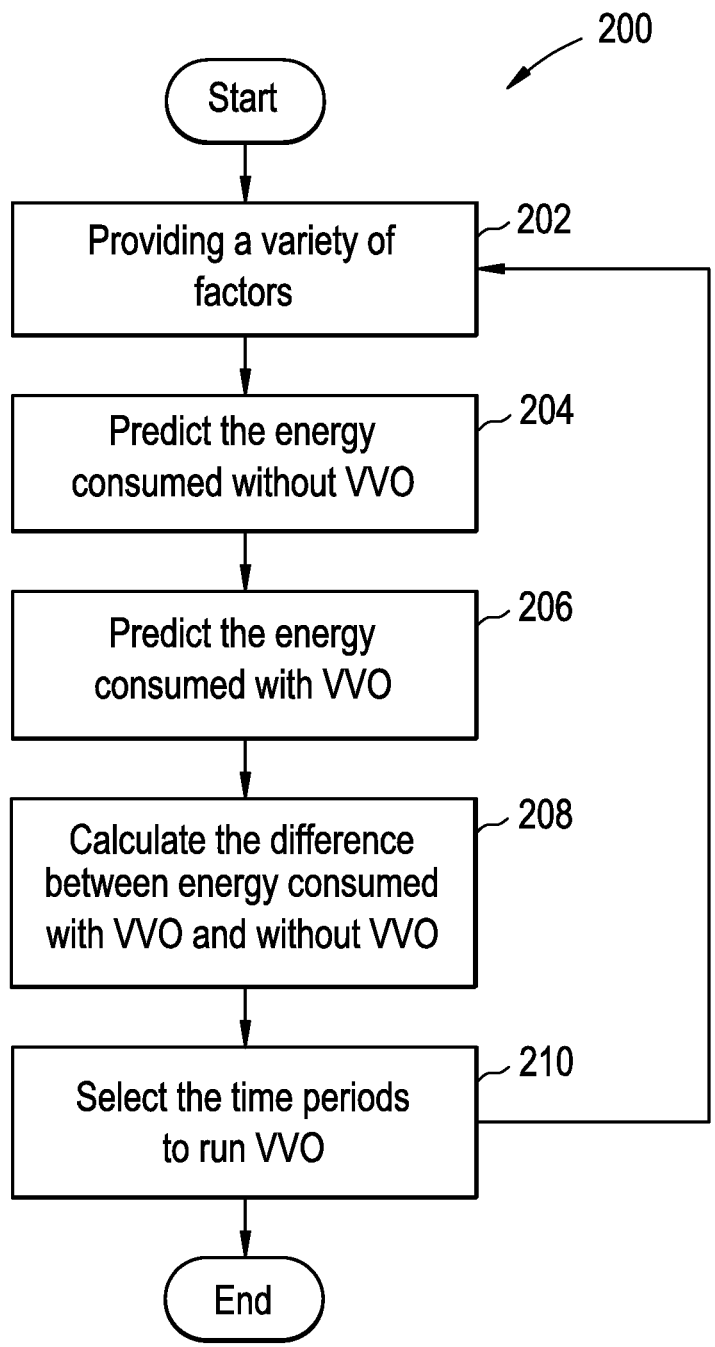
FIG. 6 is a process flow diagram illustrating a process for determining whether to activate or deactivate the VVO scheme shown in FIG. 1.

FIG. 6 is a process flow diagram illustrating a method 200 of controlling the substation master control module 26 to activate or deactivate the VVO scheme 64. The method 200 begins at 202, where a variety of factors are provided to a substation master control module 26. Referring to FIG. 1, in one embodiment, the variables are the time of day, seasonal changes, the day of the week, meteorological data such as ambient temperature, humidity and solar load, the end-of-line voltage of a feeder 36 at a reduced voltage point 50, energy consumed by the service customers, long-term seasonality, and long-term ambient conditions. These variables are communicated to the substation master control module 26 by a remote device, or are calculated by the substation master control module 26. Method 200 may then proceed to 204.

In 204, the substation master control module 26 includes control logic for predicting the energy consumed without the VVO scheme 64 activated. In one example, an energy prediction model determines the predicted energy consumption in hourly increments of time. In one approach, a neural network, a generalized additive model or a Multivariate Adaptive Spline (MARS) used instead to create the energy prediction model. Method 200 may then proceed to 206.

In 206, the substation master control module 26 includes control logic for predicting the energy consumed with the VVO scheme 64 activated. Method 200 may then proceed to 208.

In 208, the substation master control module 26 includes control logic for determining the difference between the energy consumed with the VVO scheme 64 activated and deactivated. Method 200 may then proceed to 210.

In 210, the substation master control module 26 includes control logic for selecting time periods to activate the VVO scheme 64 under the desired constraints. Specifically, the VVO scheme 64 may be used an effort to reduce real power losses in real power on the feeder 36. This approach is generally employed in the event that a utility provider wants to increase power system efficiency, especially if incentives are provided. Method 200 may then terminate, or start again at 202.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A power distribution system, comprising:
a feeder;
at least one capacitor bank selectively connected to the feeder and a capacitor bank controller, the capacitor bank controller controlling a switch for selectively connecting the at least one capacitor bank to the feeder;
a transformer for delivering power to the power distribution system through the feeder, the transformer converting one of a transmission and a sub-transmission voltage into a distribution voltage;
at least one voltage regulating device connected to a voltage regulating device controller; and
a controller in communication with the capacitor bank controller, the at least one voltage regulating device controller and the transformer, the controller selectively switching the at least one capacitor bank to adjust voltage on the feeder, the controller selectively controlling a source voltage through the at least one voltage regulating device, the controller including:
a control logic for receiving a plurality of variables that determine an energy consumption of the power distribution system;
a control logic for estimating a non-adjusted energy consumption of the power distribution system at a specified future date, the non-adjusted energy consumption based on the plurality of variables, without the controller selectively switching the at least one capacitor bank, and without the controller adjusting the at least one voltage regulating device;
a control logic for estimating an adjusted energy consumption of the power distribution system at the specified future date, the adjusted energy consumption based on the plurality of variables, with the controller selectively switching the at least one capacitor bank, and with the controller adjusting the at least one voltage regulating device;
a control logic for determining the difference between the adjusted energy consumption and the non-adjusted energy consumption; and
a control logic for sending a signal to the capacitor bank controller indicating if the controller will switch the at least one capacitor bank and the voltage regulating device controller to adjust the at least one voltage regulating device, the signal being sent at the specified future date.

2. The power distribution system of claim 1, wherein the specified future date is the next day.

3. The power distribution system of claim 1, wherein the plurality of variables are selected from the group including time of day, seasonal changes, day of the week, ambient temperature, humidity, solar load, end-of-line voltage of the feeder at a reduced voltage point, energy consumed, long-term seasonality, and long-term ambient conditions.

4. The power distribution system of claim 3, wherein the master controller includes control logic for calculating time series and seasonality variables from an ambient temperature and a load.

5. The power distribution system of claim 1, wherein the master controller includes control logic for developing an energy consumption prediction module for determining the energy consumption with the adjusted energy consumption and the non-adjusted energy consumption.

6. The power distribution system of claim 5, wherein the energy consumption prediction model is one of a neural network, a generalized additive model and a Multivariate Adaptive Spline.

7. The power distribution system of claim 6, wherein the neural network includes an input layer, a hidden layer, and an output layer.

8. The power distribution system of claim 5, wherein the energy consumption prediction model predicts energy consumption in hourly increments of time.

9. The power distribution system of claim 1, wherein the master controller selectively switches the at least one capacitor bank and selectively adjusts the at least one voltage regulating device to reduce energy consumption.

10. The power distribution system of claim 1, wherein the controller selectively switches the at least one capacitor bank in and out of the power distribution system and selectively adjusts the transformer to increase energy consumption.

11. The power distribution system of claim 1, wherein the at least one voltage regulating device includes at least one of a voltage regulator and a load tap changer.

12. A power distribution system, comprising:
a feeder;
at least one capacitor bank selectively connected to the feeder and a capacitor bank controller, the capacitor bank controller controlling a switch for selectively connecting the at least one capacitor bank to the feeder;
a transformer for delivering power to the power distribution system through the feeder, the transformer converting a one of a transmission and a sub-transmission voltage into a distribution voltage;
at least one voltage regulating device connected to a voltage regulating device controller; and
a controller in communication with the capacitor bank controller, the at least one voltage regulating device, and the transformer, the controller selectively switching the at least one capacitor bank to adjust voltage on the feeder, the controller selectively controlling a source voltage through the at least one voltage regulating device, the master controller including:
a control logic for receiving a plurality of variables that determine an energy consumption of the power distribution system;
a control logic for developing an energy consumption prediction model for determining energy consumption with an adjusted energy consumption and a non-adjusted energy consumption;
a control logic for estimating the non-adjusted energy consumption of the power distribution system during the next day without the master controller selectively switching the at least capacitor and adjusting the voltage controlled device, having the non-adjusted energy consumption based on the plurality of variables, without the controller selectively switching the at least one capacitor bank, and without the controller adjusting the at least one voltage regulating device;
a control logic for estimating the adjusted energy consumption of the power distribution system during the next day having the adjusted energy consumption based on the plurality of variables, with the controller selectively switching the at least one capacitor bank, and with the controller adjusting the at least one voltage regulating device;
a control logic for determining the difference between the energy consumption with the adjusted energy consumption and the non-adjusted energy consumption; and
a control logic for sending a signal to the capacitor bank controller indicating if the controller will switch the at least one capacitor bank and to the voltage regulating device controller to adjust the at least one voltage regulating device, the signal being sent the next day.

13. The power distribution system of claim 12, wherein the plurality of variables are selected from the group including time of day, seasonal changes, day of the week, ambient temperature, humidity, solar load, end-of-line voltage of the feeder at a reduced voltage point, energy consumed, long-term seasonality, and long-term ambient conditions.

14. The power distribution system of claim 13, wherein the controller includes control logic for calculating time series and seasonality variables from an ambient temperature and a load.

15. The power distribution system of claim 12, wherein the energy consumption prediction model is one of a neural network, a generalized additive model and a Multivariate Adaptive Spline.

16. The power distribution system of claim 15, wherein the energy consumption prediction model predicts energy consumption in hourly increments of time.

17. The power distribution system of claim 15, wherein the neural network includes an input layer, a hidden layer, and an output layer.

18. The power distribution system of claim 12, wherein the controller selectively switches the at least one capacitor bank and selectively adjusts the at least one voltage regulating device to reduce energy consumption.

19. A power distribution system comprising:
a feeder;
at least one capacitor bank selectively connected to the feeder and a capacitor bank controller, the capacitor bank controller controlling a switch for selectively connecting the at least one capacitor bank to the feeder;
a transformer for delivering power to the power distribution system through the feeder, the transformer converting a transmission or sub-transmission voltage into a distribution voltage;
at least one voltage regulating device connected to a voltage regulating device controller; and
a controller in communication with the capacitor bank controller, the at least one voltage regulating device, and the transformer, the controller selectively switching the at least one capacitor bank to adjust voltage on the feeder, the controller selectively controlling a source voltage through the at least one voltage regulating device, the controller including:
a control logic for receiving a plurality of variables that determine an energy consumption of the power distribution system, the plurality of variables selected from the group including time of day, seasonal changes, day of the week, ambient temperature, humidity, solar load, end-of-line voltage of the feeder at a reduced voltage point, energy consumed, long-term seasonality, and long-term ambient conditions;
a control logic for developing an energy consumption prediction module for determining energy consumption with an adjusted energy consumption and a non-adjusted energy consumption;
a control logic for estimating the non-adjusted energy consumption of the power distribution system during the next day having the non-adjusted energy consumption based on the plurality of variables, without the controller selectively switching the at least one capacitor bank, and without the controller adjusting the at least one voltage regulating device;

a control logic for estimating the adjusted energy consumption of the power distribution system during the next day having the adjusted energy consumption based on the plurality of variables, with the controller selectively switching the at least one capacitor bank, and with the controller adjusting the at least one voltage regulating device;

a control logic for determining the difference between the energy consumption with the adjusted energy consumption and the non-adjusted energy consumption; and a control logic for sending a signal to the capacitor bank controller indicating if the controller will switch the at least one capacitor bank and the voltage regulating device controller to adjust the at least one voltage regulating device, the signal being sent the next day.

20. The power distribution system of claim 19, wherein the controller includes control logic for calculating time series and seasonality variables from an ambient temperature and a load.

* * * * *